United States Patent
Stationwala

(10) Patent No.: US 12,483,941 B2
(45) Date of Patent: Nov. 25, 2025

(54) COORDINATED ROAMING FOR LOW ENERGY ROAMING AWARE PERIPHERAL DEVICES

(71) Applicant: Silicon Laboratories Inc., Austin, TX (US)

(72) Inventor: Hasan Ali Stationwala, Hyderabad (IN)

(73) Assignee: Silicon Laboratories Inc., Austin, TX (US)

( * ) Notice: Subject to any disclaimer, the term of this patent is extended or adjusted under 35 U.S.C. 154(b) by 392 days.

(21) Appl. No.: 18/080,135

(22) Filed: Dec. 13, 2022

(65) Prior Publication Data

US 2024/0196282 A1 Jun. 13, 2024

(51) Int. Cl.
*H04W 36/00* (2009.01)
*H04W 36/08* (2009.01)
*H04W 36/30* (2009.01)
*H04W 36/38* (2009.01)

(52) U.S. Cl.
CPC ... *H04W 36/0058* (2018.08); *H04W 36/0016* (2013.01); *H04W 36/08* (2013.01); *H04W 36/30* (2013.01); *H04W 36/385* (2013.01)

(58) Field of Classification Search
CPC ......... H04W 36/0058; H04W 36/0016; H04W 36/08; H04W 36/30; H04W 36/385; H04W 36/00833; H04W 84/18
See application file for complete search history.

(56) References Cited

U.S. PATENT DOCUMENTS

| 12,107,621 B2 | 10/2024 | Stationwala |
| 2003/0003912 A1* | 1/2003 | Melpignano .......... H04W 36/08 455/436 |
| 2017/0347301 A1 | 11/2017 | Stationwala et al. |
| 2019/0007912 A1 | 1/2019 | Do |
| 2020/0260322 A1 | 8/2020 | Chen |

(Continued)

OTHER PUBLICATIONS

Bluetooth, "Bluetooth Core Specification," Revision: v. 5.3, Jul. 13, 2021, Core Specification Working Group, vol. 6, 425 pages.

(Continued)

*Primary Examiner* — Khoa Huynh
(74) *Attorney, Agent, or Firm* — Zagorin Cave LLP

(57) ABSTRACT

A BLE system includes a network controller, peripherals, and centrals. As one of the peripherals begins to roam, the current central in a connection with the peripheral detects when the peripheral device is moving away from the current central and reports the roaming to the network controller. The peripheral receives a request from the current central to advertise for handoff evaluation during the connection and the other centrals receive requests from the network controller or from one or more of the centrals to scan for handoff evaluation purposes. The centrals determine the received signal strength from the received advertising packets and send the received signal strengths to the network controller. The network controller determines a next target central based on the received signal strengths. The network controller then causes the peripheral to disconnect from the current central and the current central advertises and establishes a connection with the next target central.

20 Claims, 6 Drawing Sheets

(56) References Cited

U.S. PATENT DOCUMENTS

| | | |
|---|---|---|
| 2020/0260448 A1 | 8/2020 | Chen |
| 2022/0221924 A1 | 7/2022 | Riviello |
| 2023/0075058 A1 | 3/2023 | Gibbs |
| 2023/0269789 A1* | 8/2023 | Azam .................. H04W 48/18 370/329 |
| 2023/0309163 A1* | 9/2023 | Mitty .................. H04L 65/1069 |

OTHER PUBLICATIONS

Woolley, M., "The Bluetooth® Low Energy Primer," Version 1.0.4, Jun. 6, 2022, 87 pages.
Silicon Labs, "UG103.14: Bluetooth® LE Fundamentals," Revision 0.7, downloaded from www.silabs.com on Nov. 8, 2022, 21 pages.
Teldat, Roaming in 802.11k/v/r Wi-Fi Environments, downloaded from https://www.teldat.com/blog/roaming-802-11-k-v-r-wi-fi/ prior to Dec. 13, 2022, 15 pages.
Cisco, "802.11r, 802.11k, 802.11v, 802.11w Fast Transition Roaming," downloaded from https://content.cisco.com/chapter.sjs?uri=/searchable/chapter/www.cisco.com/content/en/us/td/docs/wireless/controller/8-1/Enterprise-Mobility-8-1, published on Aug. 6, 2019, 11 pages.
IEEE Computer Society, "IEEE Standard for Information technology—Telecommunications and Information Exchange Between Systems—Local and Metropolitan Area Networks—Specific Requirements," IEEE Std 802.11k™-2008, Part 11, Amendment 1, Jun. 12, 2008, 244 pages.
IEEE Computer Society, "IEEE Standard for Information technology—Telecommunications and Information Exchange Between Systems—Local and Metropolitan Area Networks—Specific Requirements," IEEE Std 802.11v™-2011, Part 11, Amendment 8, Feb. 9, 2011, 433 pages.

* cited by examiner

COORDINATED ROAMING FOR LOW ENERGY ROAMING AWARE PERIPHERAL DEVICES

CROSS REFERENCE TO RELATED APPLICATIONS

This application relates to the application entitled "COORDINATED ROAMING FOR LOW ENERGY PERIPHERAL DEVICES" naming Hasan Ali Stationwala as inventor, application Ser. No. 18/080,130, filed Dec. 13, 2022, and which application is incorporated herein by reference.

BACKGROUND

Field of the Invention

This disclosure relates to short range wireless devices and more particularly to roaming of peripheral devices.

Description of the Related Art

Peripheral devices that operate according to the Bluetooth® Low Energy (BLE) standard can be fixed in a stationary environment such as in an appliance or light fixture, or can be mobile, such as a BLE sensor attached to a patient in a hospital, or a BLE sensor in a factory or other business environment. The peripheral devices communicate with a host device known as a central device. The central device controls communication with the peripheral device and can act as a gateway to other networks, e.g., to send the information from the sensor to another computer network via a wired (ethernet/internet) or another wireless (e.g., WiFi, 5G) communication channel. Environments such as factories, offices, hospitals, and retail environments can include multiple central devices that communicate with BLE peripheral devices. When a peripheral device moves, it can move out of range of its current central device. A peripheral that is moving and trying to roam among different central devices can face an extended disconnect state once it disconnects from its current central device and tries to reconnect to a new central device.

SUMMARY OF EMBODIMENTS OF THE INVENTION

Accordingly, embodiments herein provide for a coordinated roaming decision so a roaming peripheral faces reduced time spent in a disconnected state. In one embodiment a method includes detecting at a current central device that a peripheral device has moved away from the current central device during a connection between the current central device and the peripheral device. The current central device sends a request to the peripheral device to advertise for handoff evaluation during the connection. A plurality of other central devices receive requests to scan for advertising from the peripheral device and the other central devices determine respective received signal strengths of the advertising transmitted by the peripheral device.

In another embodiment, a system includes a current central device configured to detect that a peripheral device that is communicatively coupled to the central device in a connection is moving away from the current central device and the current central device is responsive to detecting that the peripheral device is moving away to request that the peripheral advertise during the connection for handoff evaluation. A plurality of other central devices are responsive to receiving respective requests to scan for handoff evaluation, determine respective signal strengths of one or more advertising packets that are received by the respective central devices.

In another embodiment, a system includes a network controller, a peripheral device, and a current central device that is communicatively coupled to the network controller. The current central device is in a connection with the peripheral device and configured to detect when the peripheral device is moving away from the current central device during the connection. The current central device is responsive to detecting the peripheral device is moving away, requests that the peripheral device advertise for handoff evaluation during the connection. A plurality of other central devices responsive to advertising scan requests, determine respective signal strengths of one or more received advertising packets transmitted by the peripheral and report the received signal strengths to the network controller. The network controller determines a next central device based, at least in part on the received signal strengths, and the network controller configures the network so the next central device and the peripheral device establish a connection.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
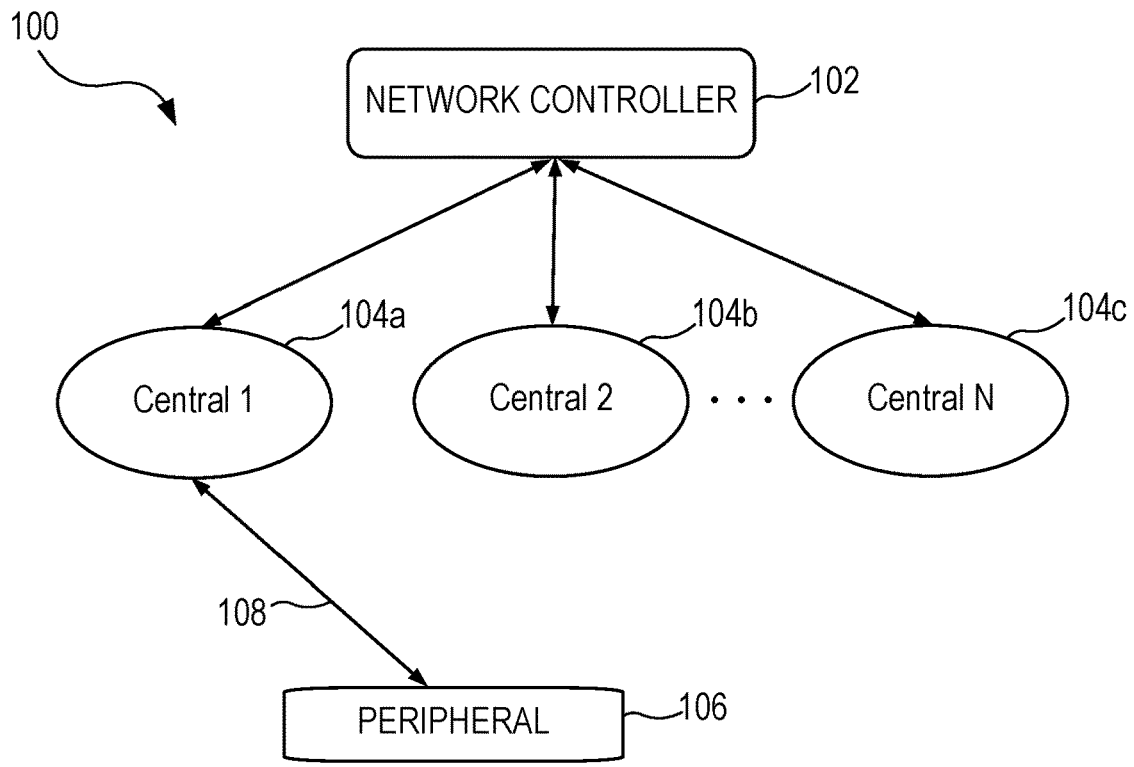
FIG. 1 illustrates a network including a network controller, centrals, and one or more peripherals.

A peripheral trying to roam across multiple central devices my face an extended disconnected state if the roaming peripheral does not coordinate with different central devices present in the system. FIG. 1 illustrates an example of a network 100 that provides coordinated decision making that reduces connection latency for roaming peripherals. The network 100 includes a network controller 102, central devices 104a, 104b, and 104c, and a peripheral device 106. The number of peripheral devices and the number of central devices in the network depends on the particular environment including the physical size of the network. For the network 100, only three centrals and one peripheral are shown for ease of illustration. In FIG. 1, peripheral device 106 and the central devices communicate via the BLE protocol. Assume that peripheral device 106 and central device 104a are in a connection 108. During the connection, each connection event starts at the beginning of a connection interval, which interval is specified during setup of the connection. During the connection interval, the central can send packets to the peripheral and the peripheral can send packets to the central in accordance with the BLE protocol. The peripheral can send packets to the central up until the end of the connection interval at which time a new connection event starts.

In addition to the connection interval, another aspect of a particular connection is a frequency hopping pattern. Frequency hopping is used to avoid congestion. In an embodiment, the frequency hopping patterns are based on a channel selection algorithm, particularly Channel Selection Algorithm #2, defined in the Bluetooth Core Specification Version 5.3, Vol 6, Part B, Section 4.5. Other embodiments support both Channel Selection Algorithm #1 and Channel Selection Algorithm #2. While a connection event stays on the same frequency, each new connection event changes to a different frequency according to the frequency hopping pattern. In the case of Isochronous channels, each event is further divided into multiple sub-events that utilize frequency hopping. Each sub-event comprises exactly one transmission from the central and a corresponding response from peripheral. In addition, BLE devices utilize adaptive frequency hopping so busy channels can be avoided. Thus, if a frequency is selected to be used for a connection event but that frequency is heavily used and marked as blocked on the channel map, that frequency can be avoided and the next frequency specified by the algorithm is used instead. Of course, if there is no data to send, the peripheral (or central) does not send data and the peripheral (or central) can skip a certain number of connection events defined by the peripheral latency parameter before a disconnect occurs. For purposes herein, the assumption is that the peripheral has data to send, e.g., a medical sensor attached to a patient or a component moving around a factory, and it is desirable to keep the peripheral device connected to a central device with minimum disconnect time as the peripheral device roams. If the peripheral has no data to send for an extended period of time then of course, disconnect time does not matter. In FIG. 1, the central devices 104a, 104b, and 104c are connected to the network controller 102 via a communication backbone that can be wired, wireless, or a combination, e.g., 5G and optical fiber. The network controller may reside in a computer that is distant from the central devices, e.g., in the "cloud", or at a location that is more local with respect to the central devices. While only one peripheral device is shown in FIG. 1, the system shown in FIG. 1 typically has multiple peripheral devices that are moving across the network space.

Each central device communicates with the network controller over a communication path as described above, but each central device also communicates with at least one other central device using the BLE protocol so roaming information can be disseminated to all of the central devices as further described herein. The central devices may be configured in a mesh network to allow communications from one of the central devices to all of the other central devices. In such a mesh network, the communication in which central device 104a communicates with central device 104c includes a hop through central device 104b. Alternatively, central device 104a may communicate with central device 104b, which in turn communicates with central device 104c and so forth. Other communication possibilities exist as well. In embodiments, the central devices may be within range of each other and a central can broadcast information to the other centrals regarding coordinated sensing.

Assuming the desirability to maintain a connection with a central device, the topology illustrated in FIG. 1 allows a coordinated roaming decision so as peripheral 106 roams, it can reconnect to the most suitable one of the centrals 104b or 104c with switching latency from one central device to another device being reduced to an acceptable level for the particular application. While three centrals are shown in FIG. 1, embodiments can have any suitable number of central devices to match the physical size of the network space and the number of peripheral devices.

Embodiments described herein use coordinated air monitoring by the central devices in the network, reporting the results of the coordinating air monitoring to the network controller, and the network controller determining a suitable next central device for the roaming peripheral. In the coordinated air monitoring embodiment, the handoff to the next central device occurs without the peripheral being aware or involved in the handoff beyond implementing standard BLE procedures.

Figure 2:
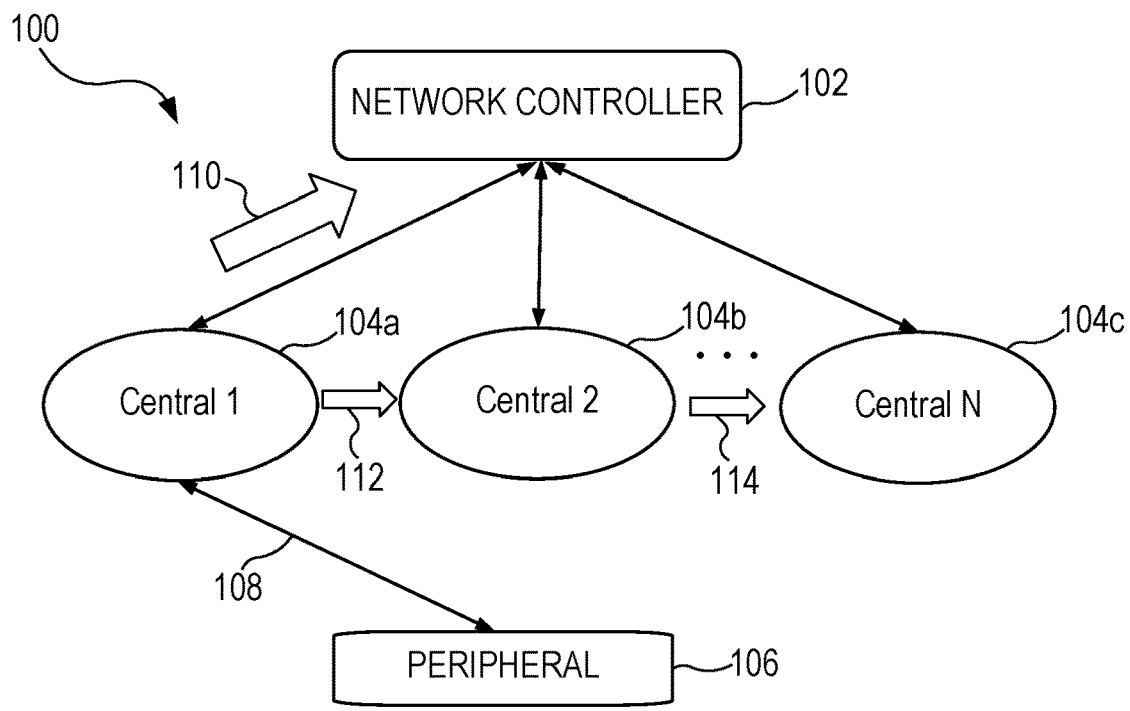
FIG. 2 illustrates the current central sending a low RSSI message to the network controller and sending coordinated sensing messages between centrals.

Referring to FIG. 2, the current central device 104a (in a connection 108 with the peripheral 106) uses a received signal strength indicator (RSSI) of transmissions from the peripheral 106 to monitor the peripheral 106. If the RSSI crosses below a predetermined threshold, the peripheral is assumed to be moving away from the current central. The current central 104a sends a message 110 to the network controller 102 to inform the network controller that the peripheral 106 is roaming. The central device 104a sends a request 112 for central 104b to perform coordinated sensing. Central device 104b in turns sends a request 114 for central 104c to perform coordinated sensing. Responsive to the received requests, the other central devices 104b and 104c perform coordinated sensing of transmissions from peripheral 106 to central 104a. In an embodiment, the centrals performing sensing means that the centrals measure the RSSI of transmissions from the peripheral 106 to the current central 104a. In various embodiments, the requests are accomplished by the central device 104a communicating to the other central devices through a mesh network, by a direct broadcast if the other centrals are in range, or by central 104a establishing a connection to central device 104b, which in turns establishes a connection with central 104c until all centrals in the network have been enabled to perform coordinated sensing.

The ability for the other central devices to listen to communications from the peripheral device to the central device 104a requires information regarding the connection between the current central device 104a and the peripheral device 106. The information required includes the connection interval, the frequency hopping pattern (or enough information to determine the frequency hopping pattern such as the connection event counter and Access address), a channel map for adaptive frequency hopping, and timing synchronization to the connection between the current central device 104a and the peripheral device 106. How the other central devices acquire the needed information for coordinated air monitoring is described further herein.

Figure 3:
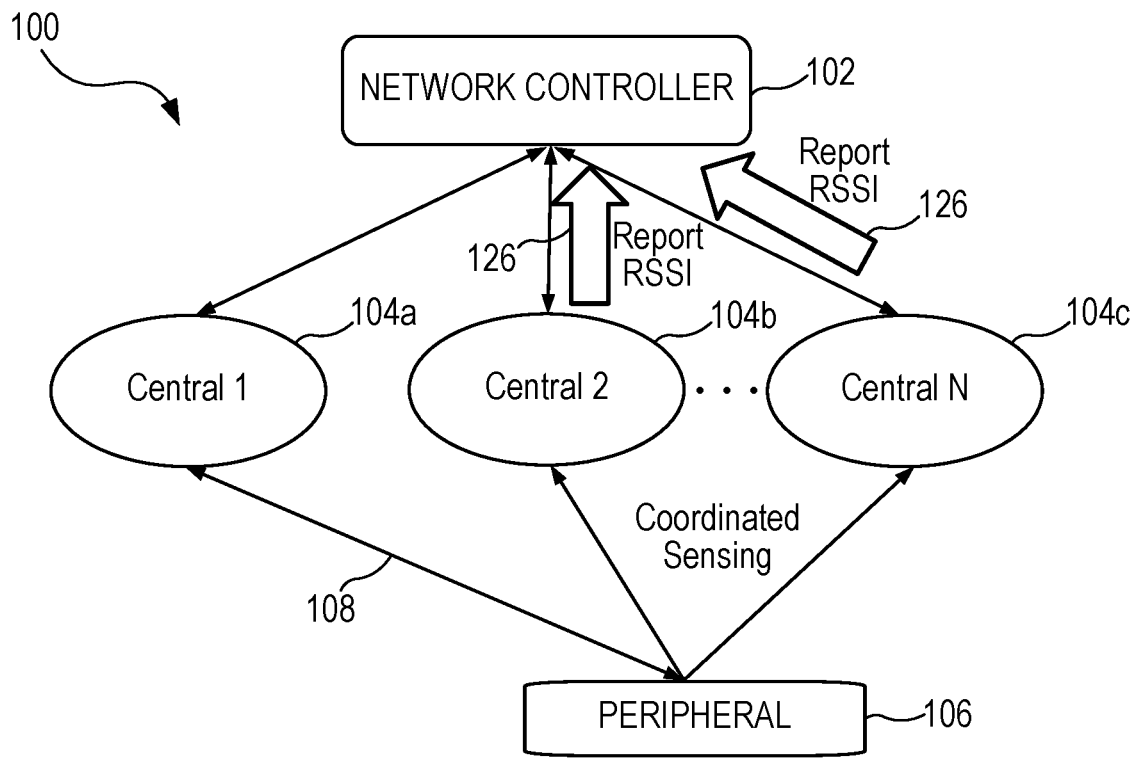
FIG. 3 illustrates the RSSI information from the coordinated sensing being reported to the network controller.

Referring to FIG. 3, once the other central devices have been requested to perform coordinated sensing, the other central devices 104b and 104c monitor the transmissions from the peripheral device to determine their proximity to the roaming peripheral, e.g., through an RSSI measurement. The central devices 104b and 104c report the RSSI results 126 to the network controller 102. The network controller 102 receives these RSSI reports and based on those RSSI reports determines the most suitable next central device for roaming peripheral device 106. Generally, the most suitable next central device for the roaming peripheral is based on the strongest RSSI, but the central devices 104b and 104c may include other information in their reporting to the network controller such as current loading. That loading factor, historical roaming patterns, and other factors may also be taken into account by the network controller 102 in determining the most suitable next central device.

Figure 4:
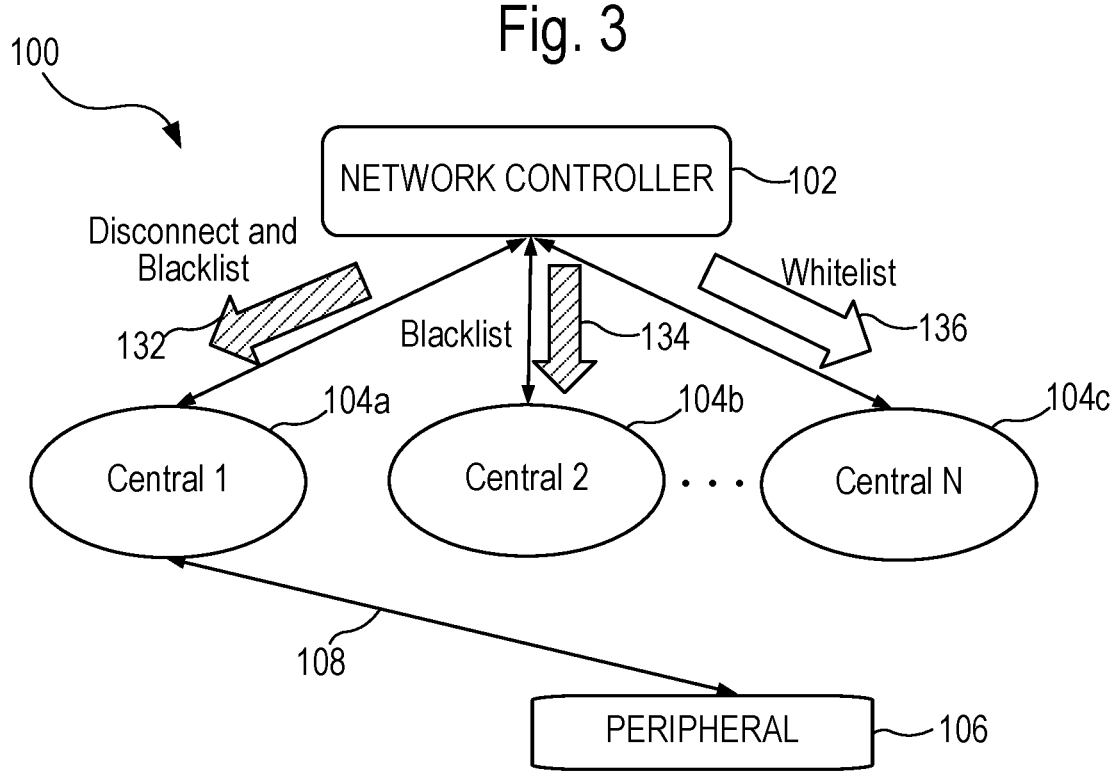
FIG. 4 illustrates blacklist and disconnect/blacklist messages being send from the network controller to the centrals.
Figure 5:
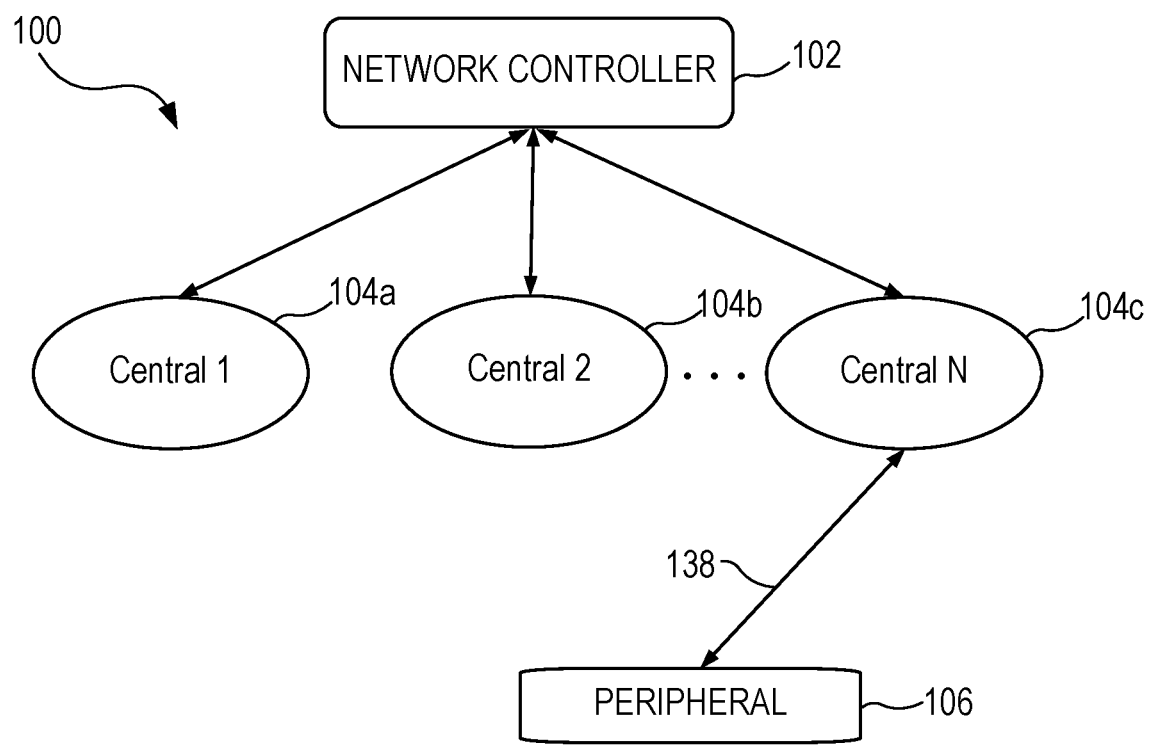
FIG. 5 illustrates the network after the peripheral has roamed and is connected to a new central.

Referring to FIG. 4, assume the network controller has determined that central device 104c is the most suitable next central device. The network controller 102 sends a message 132 to the current central device 104a to disconnect and blacklist the peripheral device 106. The network controller also sends a blacklist message 134 to central 104b. In response to message 132 the central 104a sends a disconnect message to the peripheral 106. Remember that the connection is still active between peripheral 106 and central 104a. The blacklist messages cause the central devices to ignore the new advertising from the peripheral device 106 for a predetermined time period. In an embodiment, the blacklist message includes the time period. In embodiments, the time period is configurable per system requirements. In another embodiment the target central sends a message to the network controller when the connection is established, and once the connection with the target central is established, the system controller notifies the centrals that received a blacklist message to stop blacklisting the peripheral. The peripheral device starts advertising after the peripheral disconnects from the connection 108 with central 104a. In embodiments, the network controller 102 sends a whitelist message 136 to the next central device 104c, which causes the central device 104c to respond to the advertising from peripheral 106 with a connection request. In other embodiments, rather than send a whitelist message, the network controller configures the network to ensure the connection between central device 104c and the roaming peripheral 106 occurs by sending blacklist messages to all the central devices except central 104c. In that way, central 104c is the only central that responds to the advertising from peripheral 106 with a connection request. Referring to FIG. 5, the network 100 is shown again with the peripheral device 106 in a connection 138 with central device 104c. By establishing the most suitable next central and exiting the existing connection with central 104a responsive to the disconnect command, the latency between connections 108 and 138 is reduced.

Figure 6:
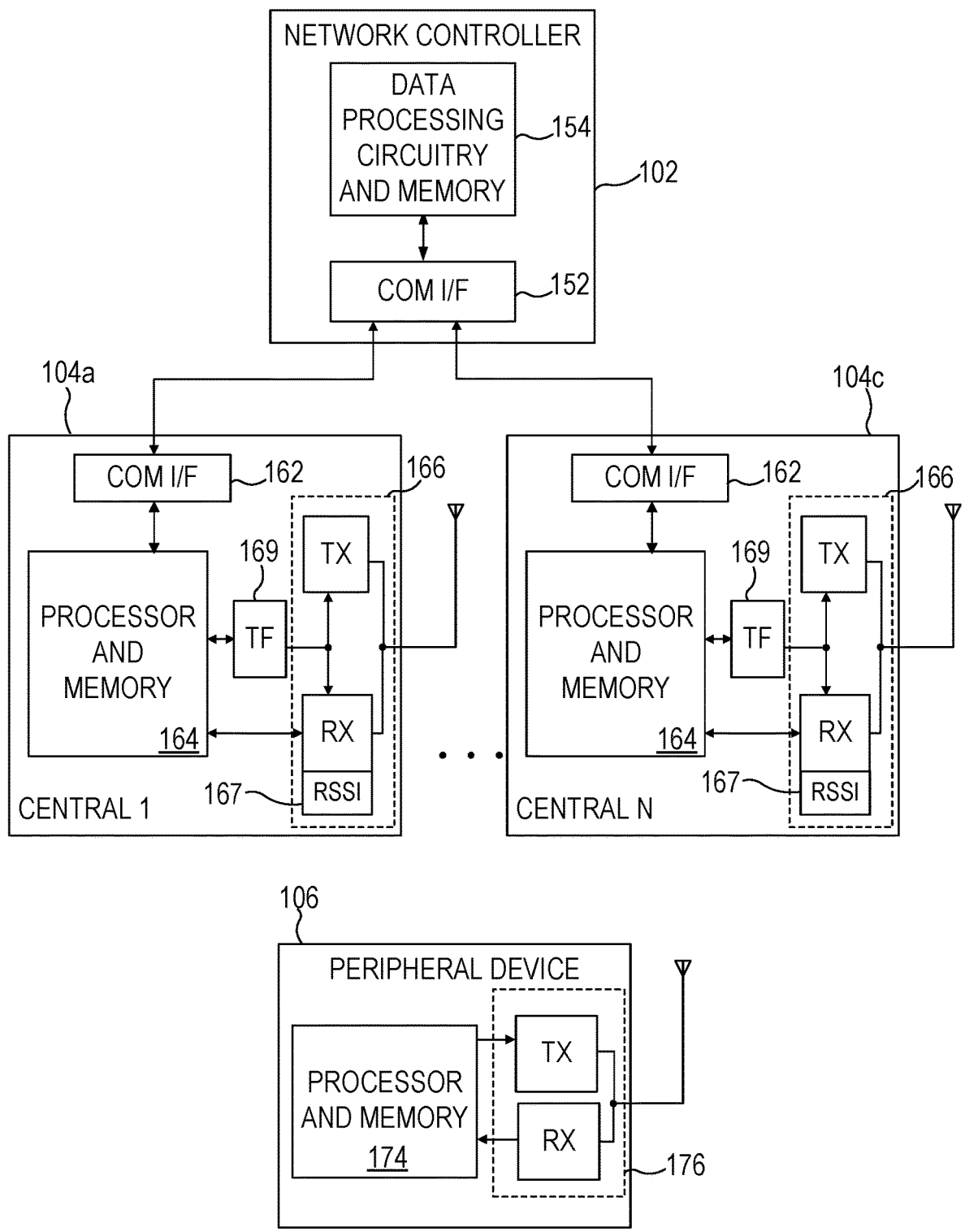
FIG. 6 illustrates a high level block diagram of the network controller, two centrals, and a peripheral.

FIG. 6 illustrates high level block diagrams of embodiments of the network controller 102, the central devices 104a and 104c and the peripheral device 106. The network controller 102 that includes a communication interface 152 to communicate with the centrals 104a and 104c. The network controller further includes data processing circuitry and memory 154. The data processing circuitry may include one or more processors and the memory may include both volatile and non-volatile memory. The processor determines which of the centrals is the next central based on the RSSI (and other relevant data) reported from the centrals performing coordinated sensing. The central devices 104a and 104c include communication interfaces 162 to communicate with network controller 102. As mentioned earlier, that communication may be wired, wireless, or a combination depending on the location of the network controller. Each of the centrals include a transmitter/receiver (TX/RX) 166 that communicates in accordance with BLE standard. Aspects of that communication are controlled by the processor and memory 164. The memory stores programming for the processor to perform the functionality described herein. For example, the processor determines the packets necessary to send to other centrals to enable concurrent air monitoring of peripheral transmissions. The receiver includes an RSSI block 167 that measures the strength of the incoming signal and supplies that information to the processor and memory 164 for reporting to the network controller 102. In addition, a timer function (TF) 167 allows time stamping of packets sent and received by the centrals. The peripheral device 106 includes a transmitter/receiver (TX/RX) 176 that operates in accordance with BLE standard. Aspects of that communication are controlled by the processor and memory 174.

Figure 7:
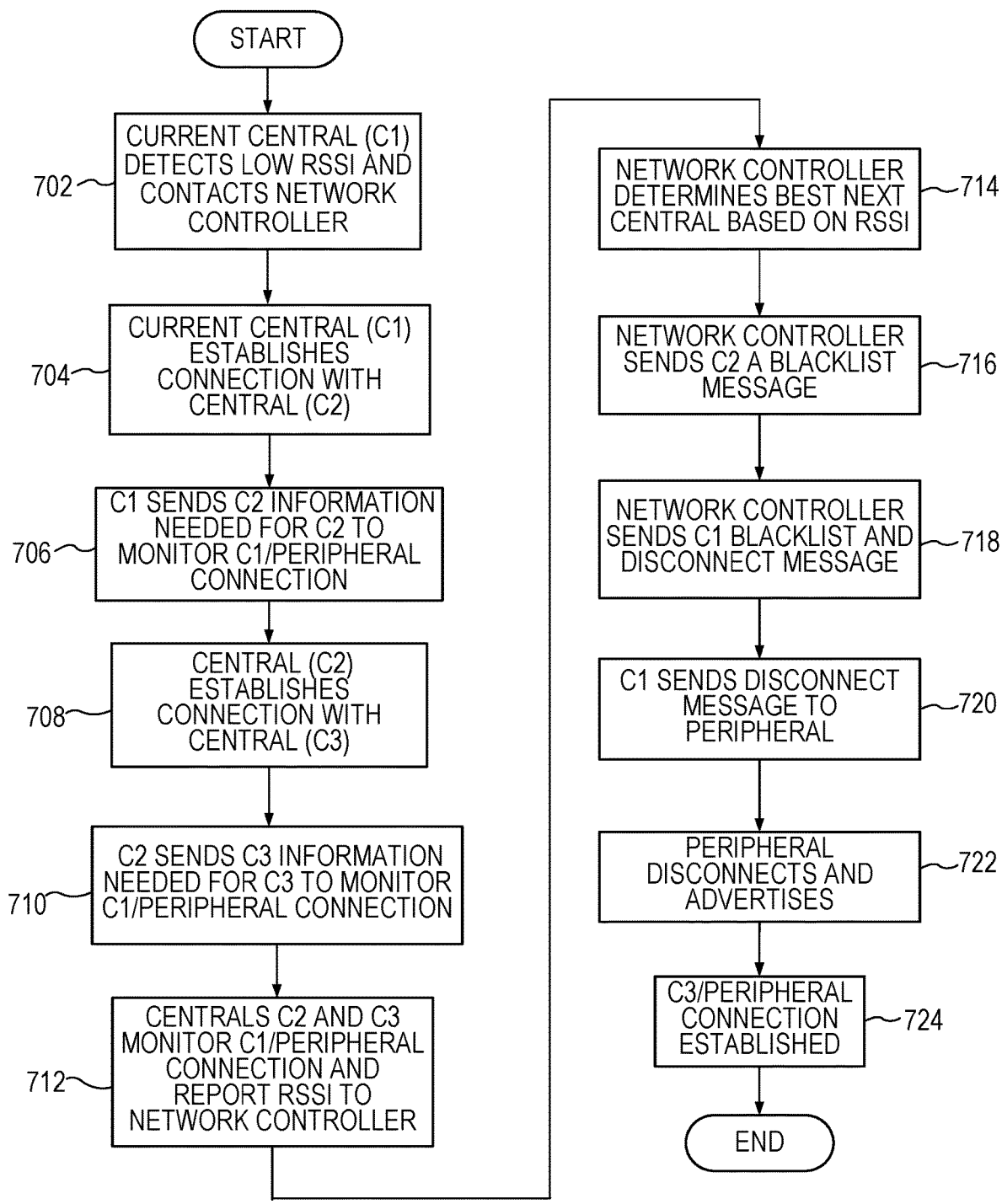
FIG. 7 illustrates a flowchart for a coordinated roaming decision using air monitoring in which the peripheral is unaware.

FIG. 7 is a flow chart illustrating the operation of the air monitoring embodiment. In 702, during a connection between a current central (C1) and a peripheral, the current central (C1) detects a low RSSI. The current central communicates that to the network controller. The current central (C1) establishes a connection with an adjacent central (C2) in 704 using conventional BLE protocol. The current central sends information to C2 in 706 so C2 can monitor transmissions from the peripheral currently in a connection with C1. That information includes the start of a connection interval in C1 time, the number of the connection event based on a counter in the central that increments for each connection event, the hopping pattern and channel map used for adaptive frequency hopping. The connection setup between C1 and C2 establishes a time difference between the local clocks on C1 and C2 thereby allowing central C2 to translate the start of the next connection interval to C2 time. That allows C2 to start monitoring transmissions from the peripheral at an appropriate time, e.g., during the next connection interval or sooner. Because C2 has become aware of when to expect a transmission from the peripheral in order to sense the signal strength, C2 can place this activity in pending tasks and continue with other activities, e.g., catering to other peripherals.

In 708 central C2 establishes a connection with a next peripheral (C3) using a conventional BLE protocol. In 710 C2 send information to C3 that allows C3 to monitor the C1/peripheral connection. That includes frequency hopping information, the connection interval, and necessary timing synchronization. C3 converts C2 timing information to C3 timing information based on the delta between the C2 and C3 clocks, thereby allowing C3 to synchronize to the timing of the C1/peripheral connection. When all centrals in the network have been synchronized to the timing and frequency hop pattern of the C1/peripheral connection, the flow goes to 712.

In 712, the centrals that are not in a connection with the peripheral device monitor the transmissions from the peripheral in the C1/peripheral connection and report their RSSIs to the network controller. In 712, the network controller determines the best next central based on the RSSIs and any other information the controller receives or knows is relevant. As mentioned earlier, that information may include central loading and roaming patterns established by the particular peripheral. In 716 the network controller sends C2 a blacklist message. In 718 the network controller sends C1 a disconnect and blacklist message. In 720 the current central C1 sends a disconnect message to the peripheral and the peripheral disconnects from C1 and starts advertising in 722. In 724 C3 and the peripheral establish a connection. In that way the peripheral has been handed off in a coordinated manner to a desired next central.

The air monitoring approach by the other central devices in the network avoids putting any additional software or hardware obligations on the peripheral device. That is, the peripheral device is not involved in the roaming handoff other than performing the normal BLE functions of disconnecting and advertising.

Figure 8:
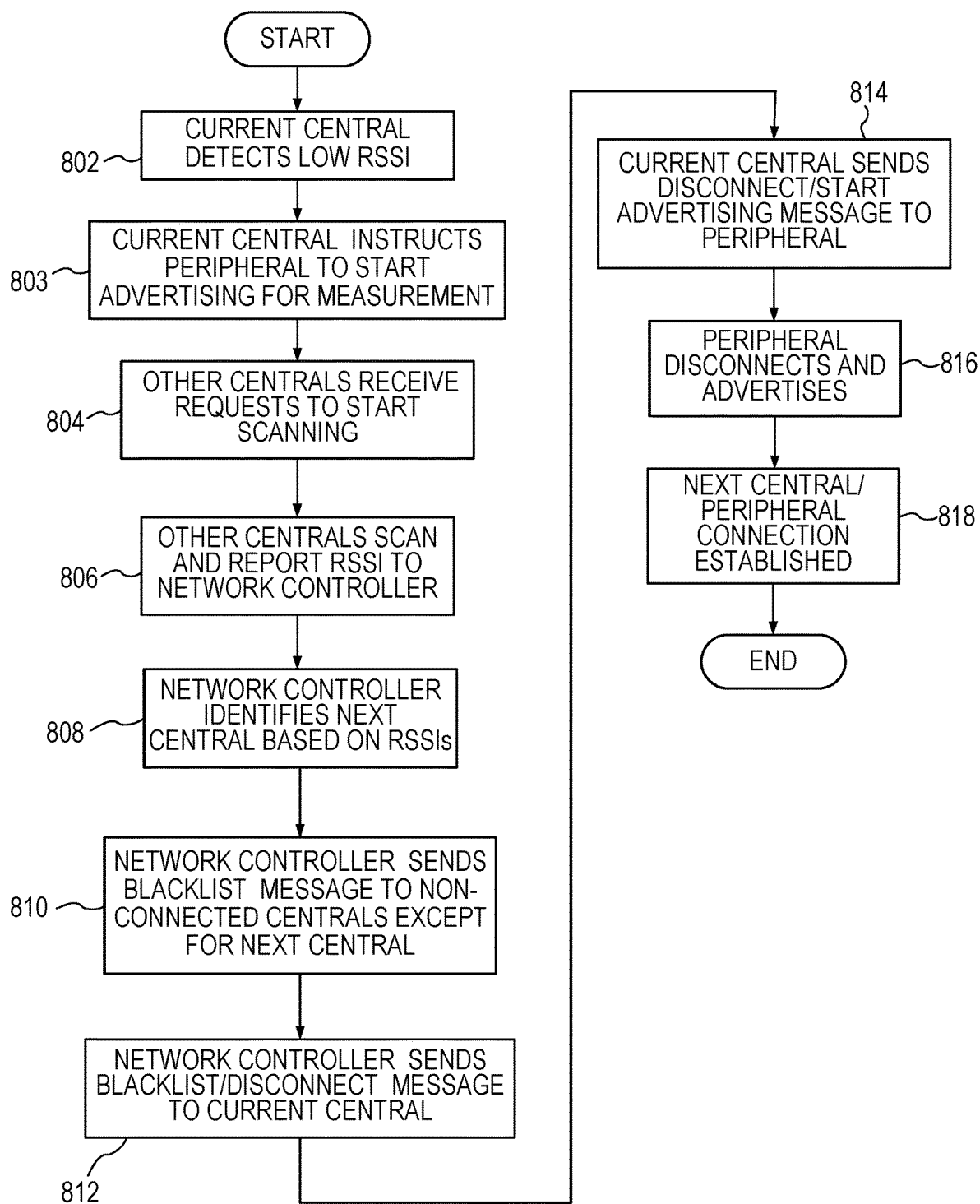
FIG. 8 illustrates a flowchart for a coordinated roaming decision in which the peripheral is aware.

In other embodiments, the peripheral is aware and actively takes part in the coordinated roaming handoff. FIG. 8 is a flow chart illustrating an embodiment of a handoff in a network in which the peripheral is aware. In 802 the current central detects an RSSI that is below a threshold value. That threshold value is chosen such that dropping below that threshold indicates that the peripheral is starting to roam. In 803 the current central instructs the peripheral to start a special handoff advertising function that is part of the handoff operation. In an embodiment, that handoff advertising function is part of a custom profile set up in the peripheral. The connection between the current central and the peripheral is maintained during the special handoff advertising. Note that BLE has 40 channels spaced 2 MHz apart. Three of the channels are primary advertising channels and the remainder are data channels, which are also secondary advertising channels. Thus, the amount of data that is sent by the peripheral during a connection interval while this special handoff advertising mode is being utilized is reduced but not eliminated. In addition, rather than needing timing synchronization, connection interval, and frequency hopping information, the centrals just need to monitor the primary advertising channels (or any other channel specified). In 804 the other centrals receive a request to start scanning. As described for the air monitoring embodiment, that request can be accomplished through communication over a mesh network, broadcast by the current central, or each central talking to an adjacent central until all centrals having received the request. In addition, the request to start scanning can come from the network controller. Thus, once the current central detects an RSSI below the threshold and alerts the network controller, the network controller requests the other centrals to start scanning for handoff evaluation. The other centrals scan the primary advertising channels or a specified primary or secondary advertising channel according to the particular implementation. Responsive to the request to start scanning for handoff evaluation, the other centrals measure the signal strength from the peripheral advertisements in 806 and report the signal strengths (RSSIs) to the network controller. In 808, the network controller identifies the next central based on the RSSIs and other information the controller deems relevant (loading, historical roaming patterns, etc.). The controller sends blacklist messages in 810 to the centrals that are not the "next central" and are not in connection with the peripheral. The controller sends a disconnect and blacklist message to the current central in 812 who sends a disconnect message to the peripheral in 814. In embodiments, the blacklist lasts a predetermined period of time before the centrals stop blacklisting the peripheral. The predetermined time period can be configurable per system requirements and can be a default value. In embodiments the blacklist messages include the time period. In another embodiment the target central sends a message to the network controller when the connection with the peripheral is established, and once the connection with the target central is established, the system controller notifies the centrals that received a blacklist message to stop blacklisting the peripheral. The peripheral disconnects and advertises in 816 and the next central/peripheral connection is established in 818. Note that rather than sending blacklist information, the network controller can request that the current central inform the peripheral of the next central and the peripheral only responds to connect requests from the next central when it advertises after disconnecting from the current central.

Thus, embodiments to provide for BLE roaming have been described. The description of the invention set forth herein is illustrative and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. A method comprising:
    detecting at a current central device that a peripheral device has moved away from the current central device during a connection between the current central device and the peripheral device;
    sending a request to the peripheral device to advertise for handoff evaluation during the connection;
    receiving requests at a plurality of other central devices to scan for advertising from the peripheral device; and
    the other central devices determining respective received signal strengths of the advertising transmitted by the peripheral device.

2. The method as recited in claim 1 further comprising at least one of the other central devices receiving a request to scan in a communication from the current central device.

3. The method as recited in claim 1 further comprising the current central device determining that the peripheral device has moved away based on a received signal strength going below a predetermined threshold.

4. The method as recited in claim 1 further comprising each of the other central devices receiving a request to scan from a network controller.

5. The method as recited in claim 1 further comprising:
    the other central devices reporting respective received signal strengths of the advertising to a network controller; and
    the network controller determining a next central device for the peripheral device based, at least in part, on the received signal strengths.

6. The method as recited in claim 5 further comprising:
    the network controller sending a message to the current central device to disconnect and blacklist the peripheral device; and
    the network controller sending respective messages to the other central devices except for the next central device to blacklist the peripheral device.

7. The method as recited in claim 5 further comprising the next central device connecting to the peripheral device responsive to the peripheral device advertising after the peripheral device has disconnected from the current central device.

8. The method as recited in claim 7 further comprising the next central device reporting to the network controller that a new connection has been established with the peripheral device.

9. The method as recited in claim 8 further comprising the network controller responsive to the reporting that the new connection has been established, instructing central devices that received blacklist messages to stop blacklisting the peripheral device.

10. A system comprising:
    a current central device including a processor providing control functionality and a transmitter/receiver to communicate with a peripheral device, the current central device being configured to detect that the peripheral device that is communicatively coupled in a connection with the current central device is moving away from the current central device and the current central device is responsive to detecting that the peripheral device is moving away to request that the peripheral device advertise during the connection for handoff evaluation; and a plurality of other central devices, the other central devices including respective processors providing control functionality and respective transmitter/receivers to receive one or more advertising packets from the peripheral device, the other central devices responsive to receiving respective requests to scan for handoff evaluation, to determine respective received signal strengths of the one or more advertising packets that are received by the respective central devices.

11. The system as recited in claim 10 wherein the respective requests contain a channel to scan.

12. The system as recited in claim 10 wherein one of the other central devices is responsive to perform the scan responsive to a communication received from the current central device.

13. The system as recited in claim 10 wherein the current central device comprises a received signal strength indicator (RSSI) to determine a signal strength of transmissions received from the peripheral device and the current central device is configured to determine that the peripheral device has moved away based on a received signal strength of a transmission from the peripheral device crossing below a predetermined threshold.

14. The system as recited in claim 10 further comprising:
a network controller communicatively coupled to the current central device and the other central devices via a communication channel that is wired, wireless, or a combination;
wherein the other central devices report received signal strengths to the network controller; and
wherein the network controller is configured to compare the received signal strengths in determining a next central device for the peripheral device.

15. The system as recited in claim 14,
wherein the current central device is responsive to requests from the network controller to send a disconnect message to the peripheral device and blacklist the peripheral device; and
wherein the network controller is configured to send requests to the other central devices, except for the next central device, to blacklist the peripheral device.

16. The system as recited in claim 14 wherein the next central device is responsive to the peripheral device advertising after disconnecting from the current central device to request a connection with the peripheral device.

17. The system as recited in claim 16 wherein the next central device reports to the network controller that a new connection has been established with the peripheral device.

18. The system as recited in claim 17 wherein the network controller is responsive to being informed that the new connection has been established, to instruct central devices that received blacklist messages to stop blacklisting the peripheral device.

19. A system comprising:
a network controller including a communication interface, data processing circuitry, and memory;
a peripheral device including a transmitter/receiver to communicate with a central device;
a current central device communicatively coupled to the network controller, the current central device in a connection with the peripheral device and configured to detect when the peripheral device is moving away from the current central device during the connection;
wherein the current central device, responsive to detecting that the peripheral device is moving away, requests that the peripheral device advertise for handoff evaluation during the connection;
a plurality of other central devices, each of the other central devices including respective transmitter/receivers and respective received signal strength indicators (RSSIs), the other central devices responsive to advertising scan requests to determine respective received signal strengths using the respective RSSIs of one or more received advertising packets transmitted by the peripheral device and report the received signal strengths to the network controller; and
wherein the network controller using the data processing circuitry and memory is configured to determine a next central device based, at least in part on the received signal strengths, and the network controller configures the system so the next central device and the peripheral device establish a connection.

20. The system as recited in claim 19 wherein the network controller configures the system in part by instructing central devices other than the next central device to blacklist the peripheral device.

* * * * *